United States Patent [19]
Billaud et al.

[11] Patent Number: 5,341,139
[45] Date of Patent: Aug. 23, 1994

[54] METHOD AND DEVICE TO DETECT THE GARBLING OF PULSES RECEIVED BY A SECONDARY RADAR

[75] Inventors: Philippe Billaud, Fontenay aux Roses; Claude de Volder, Auffargis; Michel Wybierala, Versailles, all of France

[73] Assignee: Thomson-CSF, Puteaux, France

[21] Appl. No.: 37,582

[22] Filed: Mar. 26, 1993

[30] Foreign Application Priority Data

Mar. 31, 1992 [FR] France .................................. 92 03868

[51] Int. Cl.$^5$ .......................... G01S 13/76; G01S 13/68
[52] U.S. Cl. ......................................... 342/40; 342/149
[58] Field of Search ....................... 342/40, 37, 152, 149

[56] References Cited

U.S. PATENT DOCUMENTS

| | | | |
|---|---|---|---|
| 3,378,849 | 4/1968 | Letellier | 342/149 |
| 3,732,563 | 5/1973 | Nelson . | |
| 4,334,224 | 6/1982 | Gordon | 342/40 |
| 4,926,184 | 5/1990 | Galati et al. | 342/149 |
| 5,063,386 | 11/1991 | Bourdeau et al. | 342/40 |
| 5,182,563 | 1/1993 | Blinchikoff et al. | 342/32 |

FOREIGN PATENT DOCUMENTS 0426543 5/1991 European Pat. Off. .
02021895 12/1979 United Kingdom .

OTHER PUBLICATIONS

Alta Frequenza, vol. 52, No. 5, Sep. 1983, pp. 350–364, Benelli, et al., "Angle Estimation and Discrimination of Monopulse . . . ".

*Primary Examiner*—Gilberto Barron, Jr.
*Attorney, Agent, or Firm*—Oblon, Spivak, McClelland, Maier & Neustadt

[57] ABSTRACT

In a method for the detection of the garbling of pulses received by a secondary radar, the secondary radar comprises a monopulse antenna that can be used to obtain a pulse power signal and a pulse difference measurement signal synchronous with the received pulses. The method consists in detecting, at the same time, ripples superimposed on the power signal and ripples superimposed on the difference measurement signal, the presence of at least two garbled pulses being detected by the presence of ripples on at least one of the two signals. Application to the reception circuits of secondary radars.

7 Claims, 4 Drawing Sheets

METHOD AND DEVICE TO DETECT THE GARBLING OF PULSES RECEIVED BY A SECONDARY RADAR

BACKGROUND OF THE INVENTION

The present invention relates to a method and a device for the detection of the garbling of pulses received by a secondary radar. It can be applied notably to secondary radars receiving pulse responses from several aircraft at a time.

With air traffic becoming increasingly dense, the pulses sent out by the transponders of aircraft towards secondary radars on the ground get jumbled, giving rise to phenomena of pulse-garbling. These garbling phenomena induce false codes in the reception and processing circuits of the secondary radars, which prevents the identifying of the aircraft or of their positions for example, and thereby leads to serious consequences for air traffic safety.

The presence of a pulse of a secondary response sent out by an aircraft is generally detected by means of a quantified signal referenced $Q\Sigma$, the high state of which indicates the passing to mid-amplitude of the signal received by the sum channel, referenced $\Sigma$, of the antenna of the secondary radar. The processing done by the secondary radar makes use of this type of information only, firstly in order to detect a response, especially the two known and standardized pulses which are separated by a period of 20.3 $\mu$s and sandwich the response and, secondly, to detect the code of the response having the form of a succession of pulses. Consequently, the entire secondary processing operation makes use only of the presence of high frequency power contained in pulses with a standardized duration equal to 450 ns separated from one another by a standardized pitch that is a multiple of 1.45 $\mu$s. Each pulse conveys a binary information element. Consequently, if its power exceeds a certain threshold which is a function of the reference pulses F1 or F2, this information element will be equal, for example, to 1. If not, it will be equal to 0. The power sent out by the transponders of the aircraft is generally transposed, at reception, into the range of the so-called intermediate frequencies, typically of the order of 60 MHz, and is then detected through logarithmic limiter amplifiers aimed notably at absorbing the wide dynamic range of power received and at preventing, for example, the saturation of the processing circuits.

In the event of garbling between two pulses received by a secondary radar, the prior art methods of analysis, notably the systems used to analyze the power of the signal $Q\Sigma$, do not reveal the existence of two intermingled (hence garbled) pulses when the difference in power between these pulses is smaller than 6 dB for example, i.e. when the power of one pulse is not at least equal to twice the power of the other pulse. Errors of detection are then made as regards the duration and position of the garbled pulses.

SUMMARY OF THE INVENTION

The aim of the invention is to overcome the above-mentioned drawbacks, notably by removing the constraints related to the power levels brought into play.

To this end, an object of the invention is a method to detect the garbling of pulses received by a secondary reception radar with monopulse reception antenna making it possible to obtain a pulse power signal and a pulse difference measurement signal synchronous with the received pulses, wherein said method consists in detecting, at the same time, ripples superimposed on the power signal and ripples superimposed on the difference measurement signal, the presence of at least two garbled pulses being detected by the presence of ripples on at least one of the two signals.

Another object of the invention is a device for the implementation of the above-mentioned method.

The main advantages of the invention are that it can be used to detect the reception of garbled pulses independently of the power levels or of the differences in azimuth between of the transponders, and that it is simple to implement and economical.

BRIEF DESCRIPTION OF THE DRAWINGS

Other features and advantages of the invention will appear from the following description, made with reference to the appended drawings, of which.

DESCRIPTION OF THE INVENTION

Figure 1A:
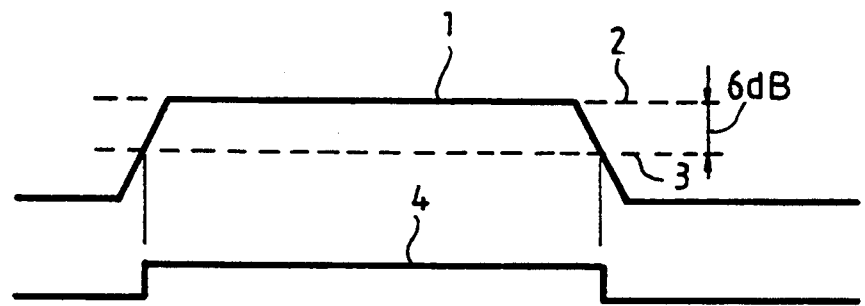
FIG. 1a shows a standard received pulse.

FIG. 1a shows the level of power of a standard pulse 1 received by reception circuits, notably by the sum channel referenced $\Sigma$ of the monopulse antenna of a secondary radar. Straight lines 2, 3 demarcate the half value of the power contained in the pulse 1. Expressed in terms of logarithmic data, the power level defined by the lower straight line 3 is reduced by 6 dB with respect to the maximum level of power defined by the upper straight line 2. The curve 4, generally referenced $Q\Sigma$, represents a signal for the detection of an amplitude which is half that of the received pulse 1, i.e. the maximum power minus 6 dB.

Figure 1B:
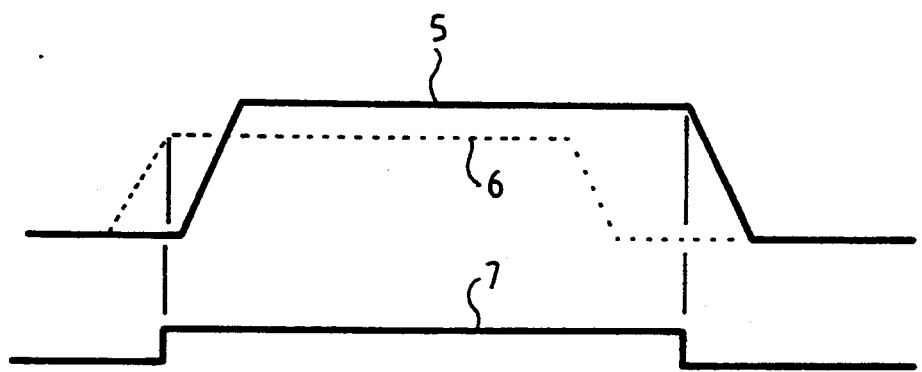
FIG. 1b shows the intermingling, hence the garbling, of two received pulses.

FIG. 1b shows an example of garbling where two pulses 5, 6 sent out, for example, by two different aircraft get intermingled, and hence garbled, to form a composite signal, at the input of the reception circuits of a secondary radar. If the difference in power between the two pulses 5, 6 is lower than 6 dB for example, then the signal 7 detecting the half power of the signals received does not differentiate between these two pulses 5, 6.

The reception antennas used in the secondary radars are generally monopulse antennas and therefore contain a sum channel referenced $\Sigma$ and a difference channel referenced $\Delta$. The channel $\Sigma$ is essentially used to receive the power of the signal sent out by the transponder of an aircraft and hence to detect the response and the code contained in this signal. The channel $\Delta$ is used with the channel $\Sigma$ to form a voltage, which is a ratio of the signal received by the channel $\Delta$ to the signal received by the channel $\Sigma$, related to the off-alignment of the aircraft with respect to the axis of the antenna of the secondary radar. This voltage is therefore used to determine the azimuth of the target with precision.

Figure 2:
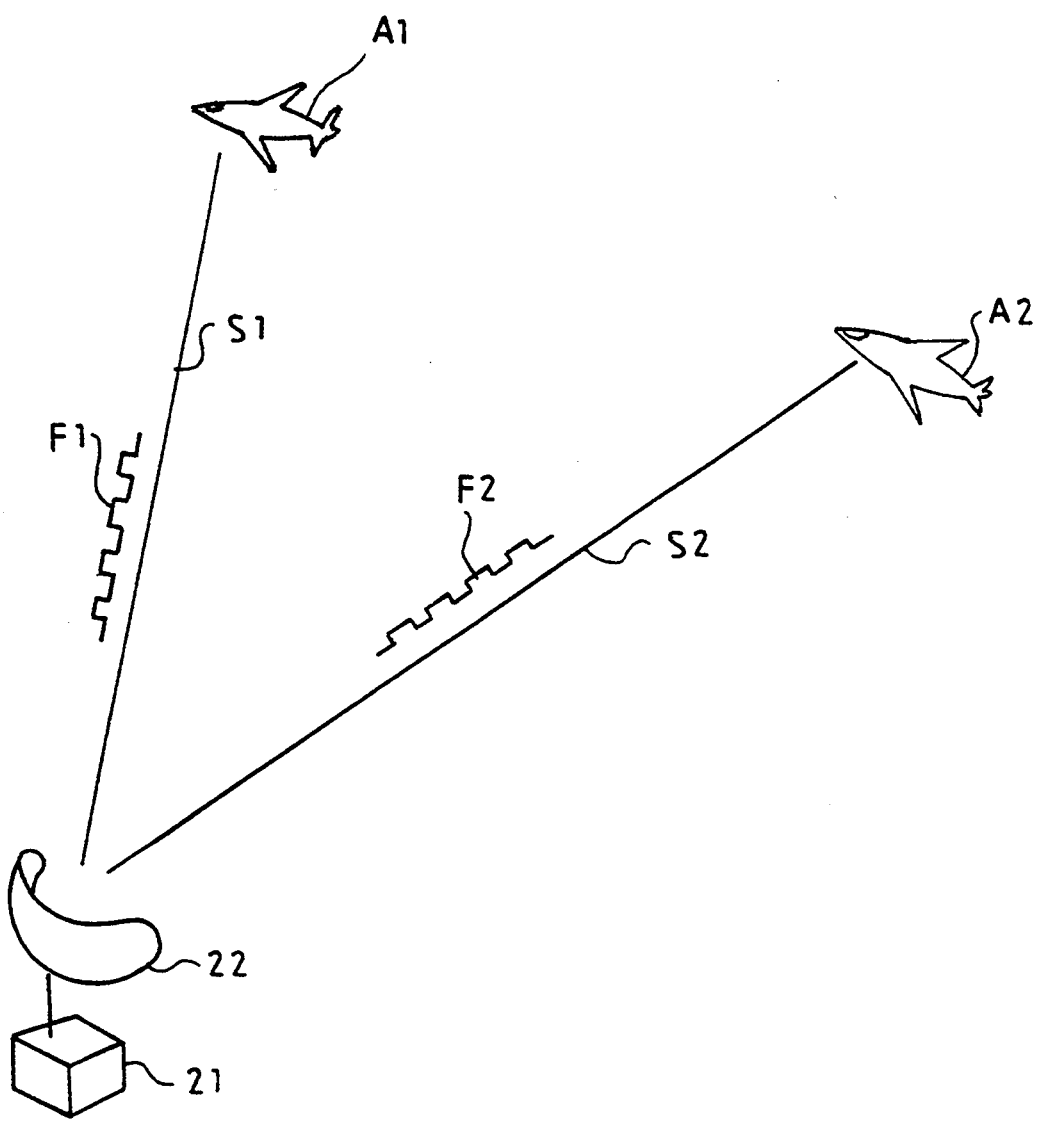
FIG. 2 shows an example where two transponders send out response signals towards one and the same radar.

FIG. 2 shows a case where the transponders of two aircraft A1, A2 send out response signals S1, S2 towards the antenna 22 of a radar 21. The aircraft A1 gives, for example, the signal S1 with power P1, frequency F1 and phase $\Phi 1$; similarly, the aircraft A2 gives the signal S2 with power P2, frequency F2 and phase $\Phi 2$.

The frequencies F1, F2 are generally included in a 6 MHz band centered on the 1090 MHz frequency. At the reception circuits of the secondary radar, these frequencies are transposed to the range of frequencies known as intermediate frequencies, for example 60 MHz. The signals transposed to the intermediate frequency range are applied, for example, to the inputs of logarithmic amplifiers in a manner known to those skilled in the art. In the case of a garbling, the signal at input of these logarithmic amplifiers is a composite signal and may be written as:

$$s(t) = W_1 \cos(2\pi F_1 t + \Phi 1) + W_2 \cos(2\pi F_2 t + \Phi 2) \quad (1)$$

where W1 and W2 reflect the energy received on the sum channel $\Sigma$ of the reception antenna of the secondary radar. W1 and W2 take account of the power values P1 and P2 of the signals S1 and S2 but also of the azimuths $\theta 1$, $\theta 2$ of the aircraft A1, A2.

The channel for the processing of the composite signal s(t) contains, for example, a mixer at its output, bringing the signal back to its initial frequency band. This mixer delivers a pulsed signal referenced $Log\Sigma(t)$. The computations and experiments of the Applicant have shown that the amplitude of this signal could be written as follows:

$$\text{Amplitude } Log\Sigma(t) = \frac{W_1^2 + W_2^2}{2} \cos\phi + \quad (2)$$
$$W_1 W_2 \cos\phi \cos(2\pi(F_1 - F_2)t)$$

when $\Phi 1 = \Phi 2 = \Phi$. Nevertheless, this relationship (2) gives a good approximation of the signal obtained at output of the processing channel, whatever may be the phases $\Phi 1$ and $\Phi 2$. Apart from a d.c. component reflecting the power of the received signal, a beat at the frequency F1–F2 appears. This beat is in fact not sinusoidal, notably owing to the non-linearity of the circuits and because the intermodulation products of a mixer are not limited to first order products. Nonetheless, if the beat does not constitute a pure sinusoid but an alternating signal that gets superimposed on the d.c. component, it constitutes, in certain cases, a good representation of the real phenomenon of garbling, for example in cases where the difference in power between the two signals S1 and S2 is high, for example of the order of 10 dB. This variation is expressed by a 3 dB peak to peak ripple on the output signal $Log\Sigma(t)$.E Instead of making use of the signal of the sum channel $\Sigma$, $Log\Sigma(t)$ indicating the power, it is possible, according to the invention, to make use of the difference measurement signal, written as $\Delta/\Sigma/(t)$, which is known to those skilled in the art, representing the ratio of the signals coming from the difference channel $\Delta$ to the signals coming from the sum channel $\Sigma$. In the event of garbling, a beat component at the frequency F1–F2 further appears in the expression of $\Delta/\Sigma$, but in this case it is more difficult to define the amplitude of the beat. This amplitude depends on the power values received on the sum channel $\Sigma$ and the difference channel $\Delta$, the action of the reception circuits, notably limiters, and the variation between the azimuths $\theta 1$ and $\theta 2$ of the two aircraft.

According to the invention, to detect the garbling of pulses received by the secondary radars, it is therefore seen that it is possible to exploit both the signal $Log\Sigma(t)$ and the signal $\Delta/\Sigma(t)$. In the case of the processing of the signal $Log\Sigma(t)$, the ripple observed on this signal is all the greater as the signals received by the sum channel $\Sigma$ have the same power and different frequencies F1 and F2. A shape analysis of the signal $Log\Sigma(t)$ detecting variations in amplitude is therefore effective when, for example, the response signals sent by the two aircraft A1, A2 have substantially equal energy balances and their frequency difference is high, independently of other parameters. Similarly, it can be seen that a shape analysis of the signal $\Delta/\Sigma(t)$ detecting variations in amplitude is particularly efficient when the response signals S1, S2 of the two aircraft A1, A2 have different energy balances and when the difference between the frequencies of these signals as well as the difference between the azimuths $\theta 1$ and $\theta 2$ of the two aircraft is great.

The method according to the invention therefore consists in analyzing the pulse signals $Log\Sigma(t)$ and $\Delta/\Sigma(t)$ as follows: the appearance of ripples on these signals implies the existence of at least two pulses received by the secondary radar. The absence of ripples means that only one pulse is received. The detection of ripples in the pulses $Log\Sigma(t)$ and $\Delta/\Sigma(t)$ will be done, for example, by their sampling. With several samples being taken inside the pulse, the fact that it is not possible to find a stable state or a convergence of values within a certain bracket or range of values, in other words the fact that a same value is not reproduced, will indicate the existence of ripples, hence the existence of at least two received and garbled pulses. The pulse signals $Log\Sigma(t)$ and $\Delta/\Sigma(t)$ are synchronous with the received pulses.

Figure 3:
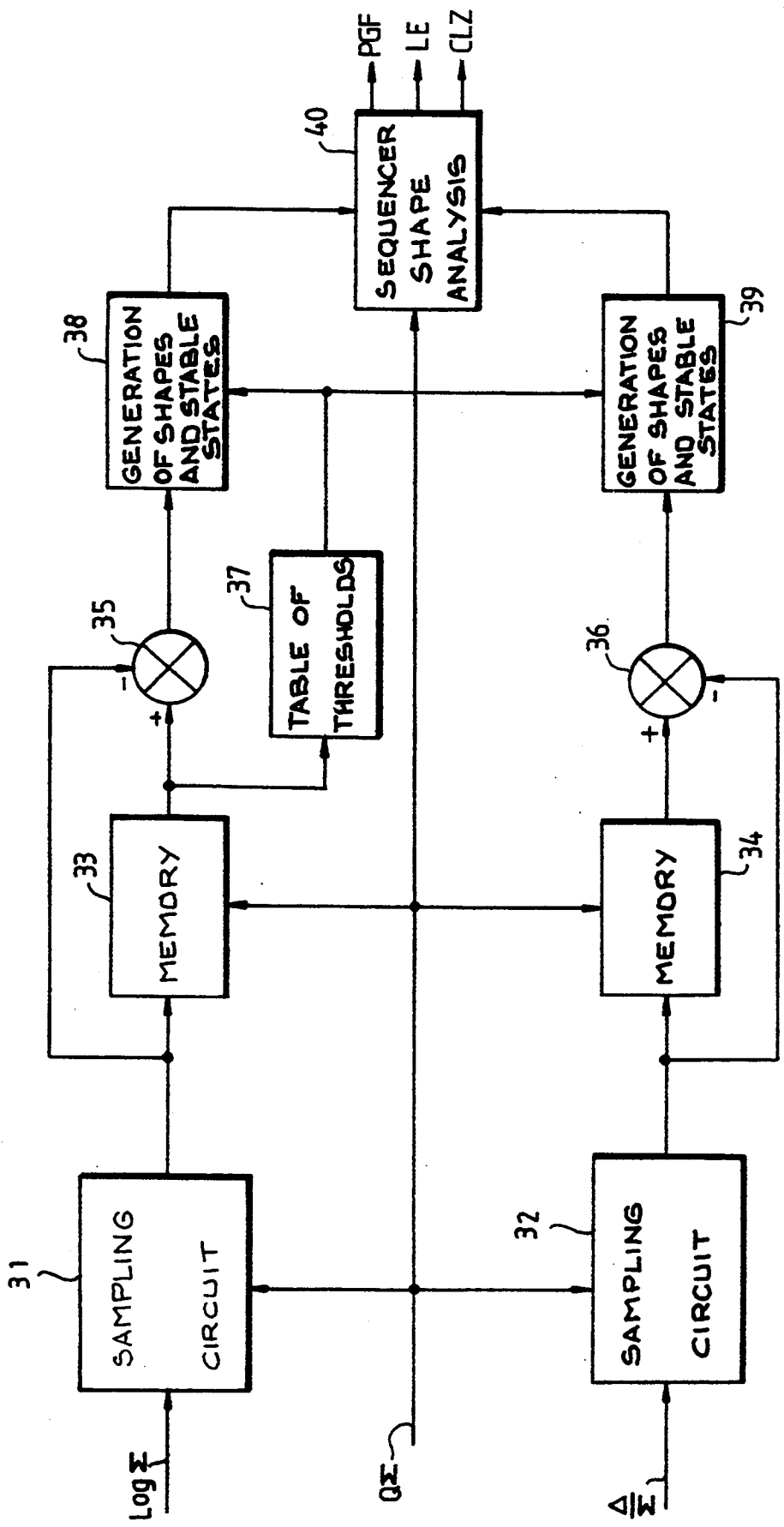
FIG. 3 is a block diagram of a possible embodiment of a device for the implementation of the method according to the invention.

FIG. 3 shows a block diagram of a possible embodiment of a device for the implementing of the method according to the invention. The signal coming from the sum channel and from the logarithmic amplifiers $Log\Sigma(t)$ is applied to a first sampling circuit 31, the output of which is coupled to the main input of a memory 33 and to the negative input of a subtractor 35. The output of the memory 33 is connected to the positive input of the subtractor 35. The sampling circuit 31 enables the sampling, at several points, of the amplitude inside a logic pulse $Log\Sigma(t)$. The sampled values are, for example, memorized by the memory 33. The subtractor 35, by taking the difference between the sampled values memorized by the memory 33 and the values at output of the sampling circuit 31, enables the detection of the presence of ripples in the pulse $Log\Sigma(t)$. To this end, the output of the subtractor 35 is connected to a first circuit 38 for the generation of slopes and stable states in the received pulse. This generation is a function of the differences between the amplitudes of the samples received from the subtractor 35 and, for example, an information element on threshold coming from a memory 37 containing a table of thresholds connected to the output of the first memory 33 and to the first circuit 38 for the generation of slopes and stable states.

Similarly to the power signal $Log\Sigma(t)$, the difference measurement signal $\Delta/\Sigma(t)$ coming from the sum and difference channels of the secondary radar is applied to a second sampling circuit 32, the output of which is connected to the main input of a second memory 34 and to the negative input of a second subtractor 36. The output of the second memory 34 is connected to the positive input of the second subtractor 36. The output of the second subtractor 36 is connected to a second circuit 39 for the generation of slopes and stable states in the received pulse, this second circuit 39 being furthermore connected to the memory 37 containing a table of thresholds. The generation of slopes and stable states in the received pulse is a function of the differences between the samples received from the second subtractor 36 and information elements on thresholds contained in the memory 37. A sequencing and shape analyzing circuit 40, connected to the outputs of the circuits 38, 39 for the generation of slopes and stable states is controlled by the signal QΣ. This circuit 40, for the duration of the signal QΣ, makes use of the succession of the signals of slopes and stable states coming from the circuits 38, 39 to which it is connected in order to set up, for example, three logic signals referenced LE, CLZ and PGF.

The signal LE may be, for example, a pulse with a width equal to about 50 ns. It may notably define the leading edge of the received pulses. In the event of total garbling between two received pulses, the sequencing and shape analysis circuit may generate, for example, two successive signals LE on the leading edge of the signal QΣ.

The signal CLZ may indicate the presence of stable states in a received pulse. In the event of garbling, it is possible, for example, to go to the state 0 to indicate that it is not possible to assign any value to the pulses Log Σ or Δ/Σ.

In the event of partial garbling between two received pulses, a first signal LE may be generated, for example, on the leading edge of the signal QΣ to indicate the position of the first pulse received, and a second signal LE may be generated following the detection of a variation of slopes by the sequencing and shape analysis circuit 40. The slopes come from the circuits 38, 40 for generating slopes and stable states, and the variation of one of them indicates the presence of a second received pulse, the start of the variation indicating the position of this second pulse. When there is no garbling, the signal CLZ goes, for example, to the state 1 and as soon as a garbling, namely in this case the second pulse, is present, the signal CLZ goes to 0.

The signal PGF indicates whether there is a total garbling, i.e. whether two received pulse are totally superimposed. The signal PGF combines the information elements contained by the signals LE and CLZ. For example, PGF=1 may indicate the presence of a total garbling and PGF=0 that the garbling is partial or that there is no garbling.

Figure 4:
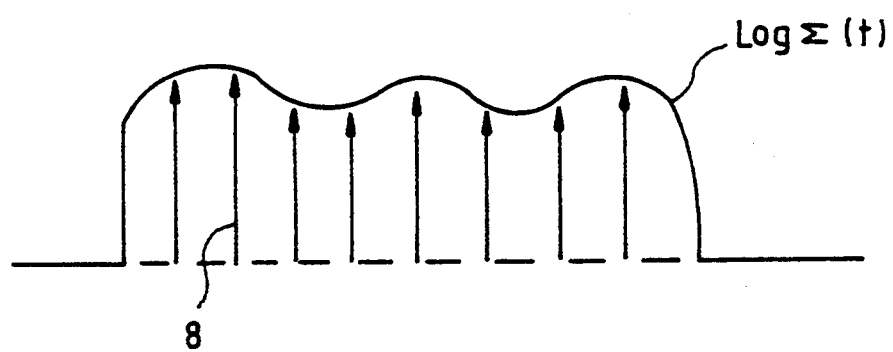
FIG. 4 is a drawing that shows a possible principle of the sampling of pulses.

FIG. 4 explains the sampling inside a pulse of the signal LogΣ(t) In the event of ripples, the amplitudes of the samples 8 do not converge within a certain range or bracket of values, defined for example by the table of thresholds 37. The sampling principle is the same for the signal Δ/Σ(t).

The efficiency of the method according to the invention, using the detection of waves superimposed on the received pulses, is especially associated with the frequency difference between the transponders of aircraft delivering their response signals, this difference needing to be sufficient, for example greater than about 1 MHz. Nevertheless, since the operations for processing the signals LogΣ(t) and Δ/Σ(t) are complementary, as a function of the power of the transponders or of their azimuthal difference, the method covers a great many possible cases and the efficiency obtained is satisfactory and, in all cases, substantially highly than that of prior art methods.

The invention may also be used, for example, in applications of Mode S response extraction circuits, where the operations for addressing the transponders are selective but where the selection does not prevent the appearance of garbling. More generally, the invention can be applied to any extraction system liable to receive garbled signals.

What is claimed is:

1. A method to detect the garbling of pulses received by a secondary reception radar with monopulse reception antenna making it possible to obtain a pulse power signal LogΣ(t) and a pulse difference measurement signal Δ/Σ(t) synchronous with the received pulses, wherein said method consists in detecting, at the same time, ripples superimposed on the power signal LogΣ(t) and ripples superimposed on the difference measurement signal Δ/Σ(t), the presence of at least two garbled pulses being detected by ripples on at least one of the two signals LogΣ(t), Δ/Σ(t).

2. A method according to claim 1, wherein the amplitudes of the power signal LogΣ(t) and of the difference measurement signal Δ/Σ(t) are sampled at several points within a pulse of these signals, the garbling of at least two garbled pulses being detected by the absence of convergence of the samples having an amplitude within a range of values.

3. A method according to claim 2 wherein the range of values is adjustable.

4. A method according to either claim 2, wherein the sampling of the power signal LogΣ(t) and of the difference measurement signal Δ/Σ(t) is activated by a received pulse detection signal.

5. A method according to claim 4, wherein the detection signal enables the detection of the pulses received at half of their maximum amplitude.

6. A method according to claim 2, wherein the samples are memorized.

7. A device for the implementation of the method according to any of the above claims, comprising:

a first sampling circuit having its input connected to the power signal Log Σ (t) and its output connected to the main input of a first memory and to the negative input of a first subtractor, the control inputs of the first sampling circuit and of the first memory receiving the pulse detection signal, the output of the first memory being connected to the positive input of the subtractor;

a first circuit for the generation of slopes and stable states, the input of which is connected to the output of the first subtractor;

a second sampling circuit having its input connected to the difference measurement signal Δ/Σ(t) and its output connected to the main input of a second memory and to the negative input of a second subtractor, the control inputs of the second sampling circuit and of the second memory receiving the pulse detection signal, the output of the second memory being connected to the positive input of the subtractor;

a second circuit for the generation of slopes and stable states, the input of which is connected to the output of the second subtractor;

a sequencing and shape analysis circuit having a first input connected to the output of the first circuit for the generation of slopes and stable states, a second input connected to the second circuit for the generation of slopes and stable states, and a third input connected to the pulse detection signal;

a memory containing a table of thresholds, the input of which is connected to the output of the first memory and the output of which is connected to the circuits for the generation of slopes and stable states.

* * * * *